June 19, 1956 W. A. REICHEL ET AL 2,751,474
VERTICAL REFERENCE SYSTEM WITH POTENTIOMETER CONTROL
Filed May 22, 1953 2 Sheets-Sheet 2
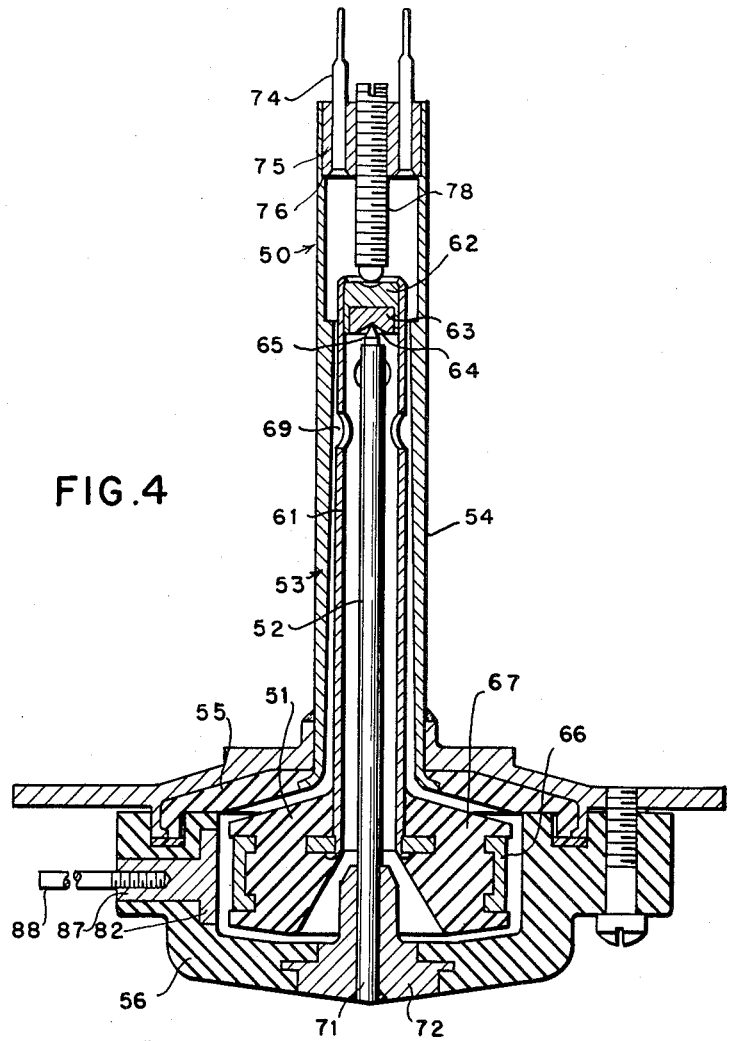
FIG.4
FIG.5
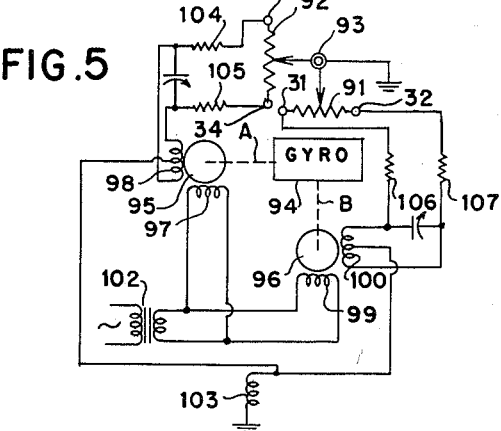
INVENTOR.
Wladimir A. Reichel
BY & John F. Emerson
ATTORNEY United States Patent Office 2,751,474
Patented June 19, 1956

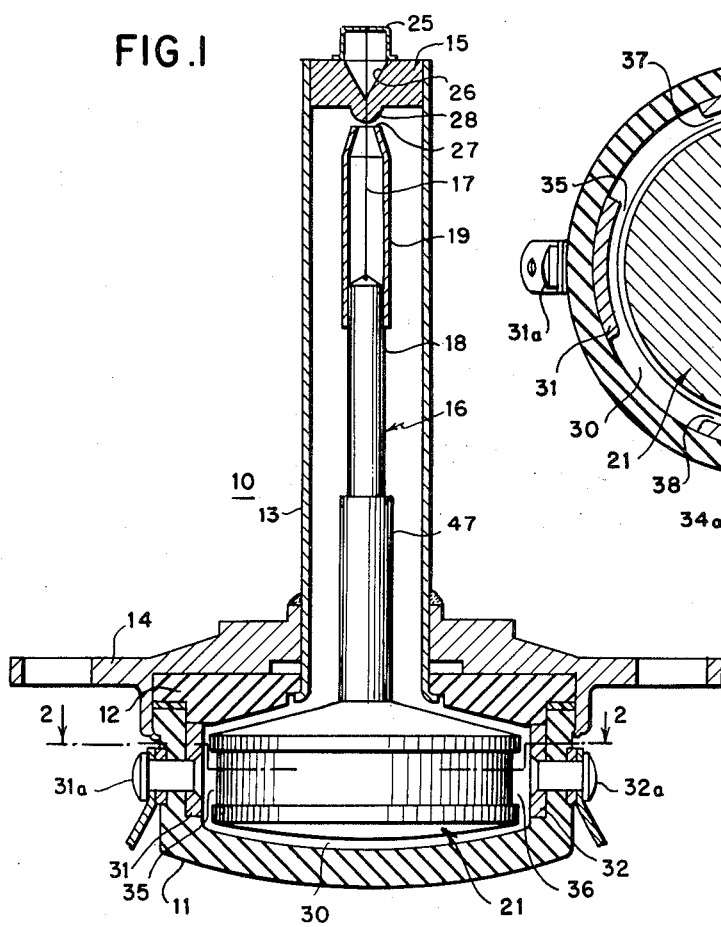
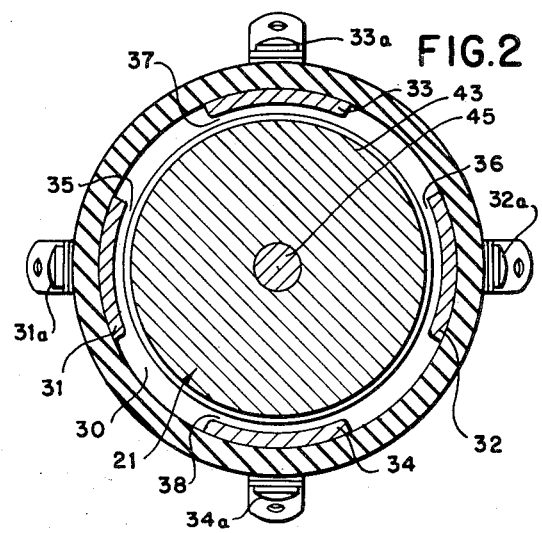
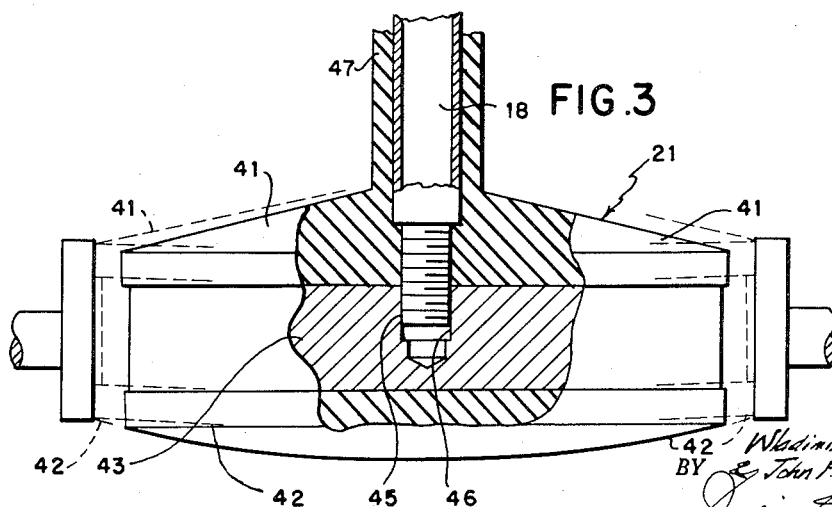

2,751,474

VERTICAL REFERENCE SYSTEM WITH POTENTIOMETER CONTROL

Wladimir A. Reichel, Hackensack, and John F. Emerson, Hasbrouck Heights, N. J., assignors to Kearfott Company, Inc., Little Falls, N. J., a corporation of New York Application May 22, 1953, Serial No. 356,635

19 Claims. (Cl. 201—57)

This invention relates to vertical reference systems, generally, and particularly to a pendulous potentiometer device that is suitably adapted to control the operation of gyro-erecting motors for a vertical gyro.

An object of the invention is to provide a device having a pendulum construction that will establish a vertical reference wherein the pendulum is generally free to move within a range limited only by construction dimensions, and controls an external erecting force generally in proportion to any displacement of the pendulum from true vertical, within said range, and wherein the pendulum is damped by immersion of the moving parts in a suitable fluid so as to prevent too rapid a response to acceleration and deceleration forces.

Another object is to provide a pendulous erecting system which has its vertical seeking components sealed in a chamber containing a fluid damping medium.

Another object of this invention is to provide a gyro-erecting switching device that may be employed to control directly the current to be supplied to the gyro-erecting motors.

Another object of this invention is to provide a pendulous vertical erecting system which has its vertical seeking components sealed in a chamber containing a fluid that serves both as a damping medium, and as a fluid electrical resistor of relatively high value, in order to permit a potentiometer circuit to be established across a predetermined path through the electrolyte, with the pendulum serving as a take-off terminal for that potentiometer circuit.

A further object of this invention is to provide a simple and compact erecting system which may be easily applied to be contained physically within an axial chamber of a gyro rotor.

In accordance with this invention a pendulum-controlled potentiometer has an electrolyte confined in a symmetrical circular chamber with two co-ordinate resistance paths established through the electrolyte, by two pairs of transversely disposed contact members, to constitute two potentiometer circuits, with the pendulum serving as a contact terminal disposed symmetrically at the intersection of those two potentiometer circuit paths in the normal vertical position of the pendulum, and serving, upon displacement from its normal position, to derive a voltage proportional to the displacement of the pendulum and dependent upon the direction of the displacement of the pendulum from its normal vertical.

Other objects and features of the invention will be pointed out in connection with the following description of the accompanying drawings, in which Figure 1 is a vertical sectional view through a vertical-erecting pendulum device embodying this invention, with a filamentary suspension;

Figure 2 is a horizontal sectional view looking downward into the cup, as taken along the line 2—2 of Fig. 1;

Figure 3 is a vertical section taken through the pendulum bob, and illustrates the slight angular taper or conical disposition of the peripheral surface of the bob to establish substantial parallelism of the bob peripheral surface to the inner surface of the cup when the pendulum bob reaches an extreme lateral displacement; and Figure 4 is a vertical sectional view of a different modification of a vertical-erecting pendulum with a post and pin type suspension;

Figure 5 is a diagram of the electrical circuit controlled by the pendulum potentiometer to control the energization of the vertical erecting motors for the gyro, which are to be controlled by the pendulum potentiometer in the application herein illustrated.

As shown in Fig. 1 a pendulum potentiometer 10 comprises a cup 11 of insulating material, a cap 12 also of insulating material for closing the rim of the cup 11, a tube 13 supported with the cap 12 in co-axial alignment with the cup 11 and suitably secured or anchored to a mounting plate 14. The plate 14 serves as a means for suitably supporting and mounting the entire potentiometer 10 on a device to be controlled, with the vertical axis of the potentiometer suitably related to such device. The upper end of the tube 13 is arranged to be sealed by a circular disc plug 15 which may be secured and sealed to the tube 13 in any suitable manner, as by soldering, in order to provide a hermetic seal for the entire housing including the cup 11, the cap 12, and the tube 13 with its sealing disc 15.

Within the housing thus constituted, is supported the pendulum structure 16, which comprises a suspension wire or filament 17, a suspension shell 18, a spacer 19, and the bob 21.

In order to provide a point suspension for the pendulum, which shall be simple to set up and relatively free from friction, a filament or wire suspension 17 is employed. The upper end of the filament 17 is anchored on a small tower thimble 25 that is in turn secured to the sealing washer 15 to maintain the hermetic seal. The filament 17 extends downwardly through a narrow hole or bore 26 in the center of the sealing disc 15 to the top surface of the tube 18. The bore 26 through the disc 15 fits snugly around the filament 17. The actual center of oscillation may therefore be taken to be the point at which the filament 17 is gripped and crimped by the sealing washer 15 at the top of the bore hole 26.

This construction of wire or filament suspension permits flexibility in assembling the parts during manufacture, which is an important consideration in view of the relatively small dimensions of this vertical seeking suspension, which is of the order of not over one and one-half inches in height for the entire structure shown in Fig. 1.

In order to prevent curling of the filament 17 due to any internal stresses initially formed in the filament or that may be generated during operation, which might consequently shift the position of the pendulum bob out of its predetermined central assembly position within the chamber in the cup, the extension tube 19 is employed so that its upper edge 27 may be placed sufficiently close to a hemispherical boss 28 on the bottom of the sealing disc 15 to prevent the wire from raising the bob more than the small tolerance dimension initially established between the upper edge 27 of the tension tube 19 and the surface of the boss 28.

In the normal position of the pendulum, the bob 21 is disposed in the center of the chamber 30 in the cup 11. That corresponds to true vertical position. The axis of the bob 21 is concentric with the axis of the cup 11 and of the chamber 30. The entire housing including the cup 11 and the shell 13 is filled with a suitable electrolyte that serves to damp the movement of the pendulum bob, and that serves also as a conducting fluid medium of suitable high resistance value to cause the device to function as a potentiometer, so the change in resistance between the bob 21 and electrodes or contact numbers embedded in the side wall surface of the cup will unbalance the two potentiometer circuits. As a result, the current through appropriate electrodes is increased to operate the proper gyro motors to align the axis of the gyro.

In order to be able to measure such changes in resistance through the electrolyte as an electrical conductor, two pairs of contact terminals 31 and 32, and 33 and 34, are disposed as shown in Figure 2, on the inner cylindrical surface of the cup 11 with pin extensions 31–a to 34–a, inclusive, through the cup wall, for connection to suitable external circuits to utilize the resistance changes and the voltage changes between the terminals of those two pairs of contact terminals in response to deviation of the pendulum from its normal true vertical position.

The contact terminals 31 to 34 inclusive, are shaped to conform to a cylindrical curved surface concentric with the axis of the cup. The front faces of the contact terminals 31 to 34 are all therefore arcuate surfaces concentric with the cup axis. The space from contact 31 to contact 32 defines one path, and the space from contact 33 to contact 34 defines the other path. When the pendulum bob 21 is in its neutral central concentric position within the cup 11, the bob will be equi-distantly spaced from each of the contact terminals 31 to 34, inclusive, as shown in Fig. 2. Since the bob constitutes, in effect, a movable contact member, the resistance between the bob and any one of the terminal contacts may be measured. In the neutral position of the bob, the gaps or spaces 35, 36, 37 and 38 between the bob and the respective contact terminals 31 to 34, inclusive, will be substantially equal. As the bob swings away from its neutral position, however, the resistance through any one gap in either path will be diminished as the bob moves closer to the corresponding contact terminal, and, conversely, the resistance through the diametrically opposite gap of that path will be increased as the bob moves away from that corresponding contact terminal.

The electrolyte may be considered to be substantially homogeneous and isoconductive. The resistance of a path between a pair of opposite contact terminals may be considered to remain substantially constant, when the bob moves directly only in the path between them, since the sum of the two gaps between that pair of contact terminals and the bob will remain substantially constant as the bob deviates from its neutral position along the path between the two contact terminals. However, the voltage distribution will vary between the two gaps, in accordance with the change in resistance between the two gaps, which, for present purposes may be considered to be linear functions of the respective lengths of the two gaps. Considering the two gaps between a pair of opposite contact terminals to represent a potentiometer resistor, the pendulum bob will serve as a take-off contact point along that potentiometer resistor. As the pendulum shifts its position relative to the contact terminals, its effective position as a take-off terminal on that resistor will move or shift, and the corresponding changes in voltage drops across the two paths may be utilized to control an external circuit.

Where the pendulum bob swings only along one path between one pair of opposite contacts, the symmetrical equality of the two gaps constituting the transverse path through the electrolyte will not be disturbed, and consequently there will be no change in the voltage drop distribution across those two transverse or lateral gaps.

However, where the pendulum movement may be in a direction oblique to both paths, and therefore have a component of movement in each path, the effect of that movement will be to shift the take-off point with respect to both potentiometer circuit paths as set up by the contact terminals 31 to 34, inclusive.

In order to impose symmetrical limits on the oscillating movement of the bob 21, the inner surface of the cup and the inner surfaces of the contact terminals 31 to 34 inclusive are disposed in the same cylindrical plane. Thus, the maximum movement which the pendulum may enjoy in any lateral direction will always be the same.

In order that the end or edge face of the pendulum will be substantially parallel to the contact terminals 31 to 34 inclusive, in the extreme lateral position of the bob, the face of the bob is tapered slightly radially inward and downwardly as illustrated in exaggerated form in Fig. 3.

As shown in more detail in Fig. 3, the bob 21 comprises top and bottom insulating discs 41 and 42, with a metallic disc 43 sandwiched between the two insulating discs 41 and 42. The three disc elements are tightly secured together by several suitable rivets, not shown, that are angularly spaced around the axis of the bob. The tubular suspension shell 18 is provided with a co-axial threaded extension 45 that is constructed to thread into threaded concentric hole 46 in the metallic disc 43 of the bob. The top insulating disc 41 embodies an extension hub 47 and is constructed to fit snugly around the lower end of the tubular suspension shell 18.

The metal disc 43 serves as the pick-off terminal for the two potentiometer circuits set up between the two pairs of contact terminals 31 to 34, inclusive, on the inner wall of the cup 11. The metallic connection from the metal disc 43 up through the metallic cylinder 18 and the suspension wire 17 to the top thimble 25 permits the thimble 25 to be utilized as a contact terminal for the bob as the take-off point for connection to the system of external electrical control circuits. The other terminals, 31 to 34, inclusive, provide the connections, which, together with the pick-off terminal from the pendulum bob, permit the variations of the gap resistances to be utilized to control external circuits, which will be described below in Fig. 5.

In Fig. 4 is shown another modification 50 of the pendulum potentiometer. In this modification, the pendulum bob 51 is pivotally supported from the top of a post 52, together with which it is enclosed in a protective housing 53 including a tube 54, a cover 55 and a cup 56.

The pendulum 51 includes and comprises a tube 61 having a bearing holder 62 anchored in a position at the upper end of the tube 61 and supporting and holding a bearing 63 on its upper side with a suitable bearing recess 64 symmetrically centered with respect to the tube 61 to enable the pendulum to automatically seat itself in proper symmetrical axial position on a pivot pin 65 at the upper end of the supporting post 52. The lower end of the pendulum tube 61 carries the pendulum weight, having a side wall in the form of a metallic circular cylindrical ring 66 on an electrically non-constructive body 67. The circular ring 66 is formed to be symmetrically co-axial with the supporting post 52 when the pendulum 51 is in its true vertical position.

The vertical tube 61 of the pendulum is provided with several perforations 69 near its top end to permit free passage of the damping fluid and electrolyte, if and when the gyro switch should become completely inverted for any reason, as might result from the tumbling of the gyro, for example, from its normal vertical operating position, when it is stopped after an operating run.

The center supporting post 52 is arranged to be disposed symmetrically along the axis of the device while in the true vertical position, and, as shown, comprises a main body or shank of uniform outside diameter, having the pivot pin 65 anchored in its upper end, and having its lower end portion 71 to serve as an anchor portion rigidly anchored coaxially in a central metal boss 72 in the bottom cup 56. The anchoring portion 71 may be press-fitted into the boss 72 or it may be slip-fitted into the opening of the boss 72 and then soldered in position to provide a rigid anchoring.

The cover 55 and the cup 56 are arranged to be tightly closed and hermetically sealed, around the rim of the cup housing for the pendulum. The entire housing thus formed is filled with a damping fluid. As previously explained, the cup 56, and cover 55 and the vertical tube 54 constitute a protective housing for the pendulum. The entire housing thus formed is filled with a damping fluid, to dampen vibrations of the pendulum. The fluid also serves as an electrolyte to transmit current between selected points within the cup, as will be presently described.

For operation of the switch, the outer tube 54 is filled with the electrolyte to a level sufficiently near the top to leave only sufficient space to permit expansion of the fluid during the normal operating temperature range, without generating internal hydraulic pressures.

For the purpose of filling the vessel after the parts are entirely assembled, the top of the outer tube 54 is provided with a small filling tube 74. The filling tube 74 extends through a closure plug 75, which is suitably anchored at the top of the outer tube 54 by a bottom shoulder 76 and a solder joint around the edge at the top of the outer tube 54. A set screw 78 is co-axially disposed in the closure plug 75, at the top of tube 54, to serve as limit stop for the pendulum whenever the switch unit becomes inverted.

When the switch housing is filled with the damping electrolyte, and exhausted, the small filling tube 74 is suitably pinched off and sealed. In the filling operation, the switch housing is filled to at least above a certain desired level near the top. A hypodermic needle of predetermined length is extended into the housing with the eye of the needle at the desired level, and the excess electrolyte is extracted, to leave an empty space of exact volume.

In order to insulate the electrolyte, which is used for its conductive characteristics and qualities as well as for its damping qualities, the cover 55 and the cup 56 are made of insulating material.

In forming the cup 56, four contact elements 82 are suitably positioned and supported on the cup, so they will be firmly anchored in place and be accurately aligned, when the cup is completed. The four contact segments 82 are formed in the wall of the cup 56, with the front surfaces of those contacts in a cylindrical plane concentric with the main axis of the pendulum device.

Each of the contacts 82 is provided with a small boss 87 that is internally threaded to receive a threaded pin terminal 88.

Since the cup 56 is an insulating material, the several contact members are insulated from each other except through the electrolyte that is used to fill the switch housing. The electrolyte has a normally high resistivity, of the order of 6,000 ohms per cubic centimeter. Its presence in the cup between the contact members is therefore not shortcircuiting.

As previously indicated, one application to which this potentiometer is here shown applied, is for the control of a gyro-erecting system, somewhat similar to that shown in U. S. Patent 2,516,912 issued August 1, 1950 to Reichel and Emerson.

The potentiometer is mounted on and with the gyro, and the pendulum serves as a vertical seeking element, relative to the earth, to control the gyro and its support, such as the platform 14 of Fig. 1, for example, to maintain a desired position relative to the earth. For that purpose, the potentiometer, as heretofore described may now be simply considered as one having its resistor in the form of an electro-conductive liquid and its equivalent sliding contact in the form of the conductive pendulum immersed in the body of said liquid electrolyte. The pendulum has a certain limited freedom to swing within such liquid resistor, and, thereby to change the effective resistance values of the arms of the potentiometer as set up in the electrolyte between the four contacts 31 to 34, inclusive. Each path between the respective pairs of contacts is thus effectively continuous and functions as a potentiometer resistor.

The electrical control system including the potentiometer and the gyro is shown schematically in Fig. 5. The potentiometer functions are indicated by two potentiometer resistors 91 and 92 and by a common contact 39 representing the movable contacts. The potentiometers 91 and 92 represent the total path resistances of the gaps between the respective pairs of contacts 31 and 32, and 33 and 34. The common terminal 93 for the indicated movable contacts represents the pendulum bob 21 as the free contact that is grounded to the metal casing of the device.

In such a system, the gyro 94 is mounted on suitable gimbals for movement about respectively normal axes, shown in Fig. 5 as axes A and B. The erection motors 95 and 96 are schematically indicated, that are utilized and disposed to apply the appropriate precessing torques to the gimbals, about those respective axes.

One precessing motor 95 is shown provided with two separate phase windings 97 and 98 to constitute a two-phase motor. The winding 97 provides a constant excitation field, and the winding 98 is a double or two-part winding to provide a directional control field. Thus the motor 95 may be selectively controlled to rotate in either direction, according to which part of winding 98 is predominantly energized.

The other erection motor 96 is similarly provided with two windings 99 and 100, by means of which that motor 96 similarly may be caused to rotate in one direction or the other, depending on which part of the two-part winding 100 is predominantly energized.

Energy for the system is supplied from one phase 102 of a suitable supply circuit through a transformer for the two exciting windings 97 and 99. A second phase 103, preferably quarter-phase relative to phase 102, supplies the energy for the directional-control windings 98 and 100.

When the system is properly centered and the supporting plate for the pendulum device is in a horizontal plane, the pendulum bob is in its neutral or exact vertical position, and the take-off terminal point 93 is at the neutral points of the respective potentiometer resistors 91 and 92 that are schematically illustrated in Fig. 5. Under those conditions, the current from phase 103 of the supply source divides equally between the two sub-paths that make up each total path represented by the respective potentiometer resistors 91 and 92. The two parts of the associated motor windings 98 and 100 connected to the respective potentiometers are likewise traversed by equal currents from phase 103. The effects of those motor windings 98 and 100 on their rotor element in the associated respective motors 95 and 96 are balanced, and no rotation of the rotors occurs.

As soon as the pendulum bob shifts from neutral position, for example in the case of the potentiometer 91, and assuming the bob to move in a direction such that the contact 93 would move to the left-hand side toward the contact terminal 31, the lowered resistance in the gap of the electrolyte at that contact 31 would correspond to lowered resistance between the take-off point 93 and the terminal 31 with a corresponding increase of current through terminal 31 and the upper part of winding 100 and with a corresponding decrease of current through terminal 32 and lower part of winding 100. As a result, the upper part of winding 100 would be more effective than the lower part of winding 100. The previous balanced effects between the two parts of the winding would be upset. The differential effect would be in the direction of the force exerted by the upper winding 100, and the rotor of the motor 96 would then turn in a direction controlled by the upper part of winding 100, in the angular direction around the axis B of the motor 96, to angularly shift the position of the corresponding gimbal until the true vertical position of the pendulum would be restored by re-establishing the horizontal position of the supporting plate for the potentiometer device.

If the position of the pendulum bob, when moved out of its neutral position, has a component of displaced position along both of the paths throughout the electrolyte, between the two pairs of contact terminals, then the pickoff point represented by the bob will effectively be shifted along both of the paths, as represented by the respective potentiometer resistors 91 and 92, to cause an unbalance that would affect one part of each directional winding of each motor more than the other part of each such winding. In that case, both motors would operate around their respective axes to re-adjust the position of the associated gimbals to restore the platform back to a horizontal position to reestablish the vertical position of the pendulum.

The potentiometer described herein has a linear characteristic over only a very short portion of its middle range, immediately adjacent its neutral point at the vertical position. Beyond that narrow range, the characteristic becomes non-linear due to the load on the potentiometer. Where the potentiometer is to be used for the application shown here, to control a vertical gyro, the lack of exact linearity is ordinarily accepted as inevitable. However, especially because of the small size of the potentiometer device shown herein of the order of one and one-half inch in height, and because of the consequent small range of swing, the device would operate most of the time on the non-linear part of its characteristic. The resulting control action on the associated control equipment would lack linear correspondence, with consequent possibility of hunting effects in restoring the gyro to desired position.

In order to compensate for such lack of linearity, resistors 104 and 105 are provided between the potentiometer 92 and the directional winding 98 of motor 95, and resistors 106 and 107 are provided between the potentiometer 91 and the directional winding 100 of motor 96. Thus, the change in resistance in the circuit to each part of the winding, due to the potentiometer change, represents a smaller variation than if the potentiometers alone were the sole control resistors in those circuits, and the potentiometer characteristic is relatively linear over a longer portion of its range.

Since the control circuit outside of the directional winding 98, of motor 95, is resistive, an adjustable capacitor 108 is provided to bridge the directional winding 98 and to establish a conjugate impedance that will look resistive to the potentiometer 92. A similar capacitor 109 is provided for the directional winding 100 of the motor 96.

By means of such circuit arrangement, as shown in Fig. 5, the potentiometer device may be employed to supply operating current directly to the windings of the control motors 95 and 96, without the need of amplifiers.

The invention claimed is:

1. A pendulous potentiometer comprising a vertical seeking pendulum supported at its upper end and having its free end oscillatable in any direction; a damping fluid immersing the free end of the pendulum, the damping fluid having current-conducting characteristics to enable it to serve as a current conducting electrolyte; contact means disposed at the ends of two equal intersecting diametral paths through the electrolyte; and means constituting a closed vessel for supporting the pendulum and the contact means and the electrolyte to place the point of intersection of said two paths in the true vertical line of said pendulum.

2. A pendulous potentiometer, as in claim 1, in which the oscillatable free end of the pendulum serves as a movable contact terminal to pick off an equivalent point potential on the potentiometer resistor defined in the electrolyte between the path-limiting contact means.

3. A pendulous potentiometer, as in claim 1, comprising a vertical seeking pendulum having an oscillatable bob at its free end shaped as a circular shell of enlarged diameter immersed in the electrolyte to present an enlarged area to the damping action of the electrolyte, the shell being externally tapered convergingly downward to establish a close parallel surface-to-surface relationship between the shell and any one of the contact means when the pendulum deviates to extreme lateral position.

4. A pendulous potentiometer device comprising a vessel having a vertical axis and containing an electrolyte and confining it symmetrically about said vertical axis within a volumetric space in the vessel so the electrolyte has a symmetrical cross-sectional area transverse to said axis within said volumetric space; a pendulum supported at its upper end and having with its free end immersed in the electrolyte so the true vertical axis of the pendulum coincides with said vessel axis; and a pair of diametrically disposed contact members equally spaced from said vessel axis and serving as terminals for a conducting path through the electrolyte, and means for connecting the pendulum and the contact members to an external circuit.

5. A pendulous potentiometer device as in claim 4, in which a second pair of contact members with similar equal spacing from said axis are diametrically disposed transversely to said first-mentioned pair, to serve as terminals for a second conducting path through the electrolyte.

6. A pendulous potentiometer device as in claim 4, including means for limiting transverse deviation of the free end of the pendulum, to prevent direct physical contact of the free end of the pendulum against a contact member.

7. A pendulous potentiometer device comprising a vessel of insulating material and formed to have a central axis, a pair of electrical terminals supported in fixed spaced relation within the vessel transversely of said axis, a fluid medium of high electrical resistivity filling the vessel between said two spaced terminals, a movable pendulous contact member supported at its upper end and having its lower free end dipping into said fluid medium and movable in response to an external force to take up a position intermediate the spaced electrical terminals as a deviation from true vertical position and means for connecting the fixed terminals and the movable contact member to an external circuit.

8. A potentiometer device comprising a closed vessel of insulating material having a chamber confined within its side wall; a fluid medium of high resistivity filling the chamber, a pair of contact elements supported in fixed spaced relation on the side wall and extending inwardly into the fluid medium and extending outwardly through the side wall to provide an outside terminal for connection to an external circuit, and a suspended contact element immersed in said fluid and movable to positions of varied distances from said fixed contact elements, to establish a variable potentiometer pick-off terminal relative to the impedance path between the two fixed contact elements.

9. A pendulous potentiometer device comprising a vessel having a vertical axis and a circular wall of insulating material concentric with said axis, a pair of electrical contacts supported in fixed spaced relation on said wall, a fluid medium having a high-resistivity characteristic and filling the space in said vessel between the pair of contacts to establish thereby an impedance path between the two contacts, and a movable contact element dipping into said fluid medium and being movable throughout the impedance path between the two contacts to serve as a potentiometer pick-off terminal relative to the impedance represented by said path between the two fixed contacts.

10. A potentiometer device as in claim 9, in which the vessel has a circular confining side wall, the said pair of contacts are diametrically disposed on the vessel, and a scond pair are also diametrically disposed on the vessel in transverse relation to the first-mentioned pair of contacts, and the movable contact has two degrees of freedom to take a position within the circular area confined by the vessel and the contact elements.

11. A potentiometer device as in claim 9, in which the movable contact element is suspended on a filamentary support for free oscillating movement within the space in the vessel, and the device includes means for keeping the filamentary support extended to its full length to keep the length of the suspension substantially constant.

12. A potentiometer device as in claim 9, in which the movable contact element is suspended on a filamentary support for free oscillating movement within the space in the vessel, and means for counterbalancing any variation in the buoyancy of the fluid medium caused by variation in density due to temperature change.

13. A potentiometer device in claim 9, in which the movable contact element is suspended on a filamentary support for free oscillating movement within the space in the vessel, and a rigid element parallel to and substantially co-extensive with the filamentary support for keeping said support extended to substantially its full length with a limited amount of lost motion or slack in the filamentary support.

14. A potentiometer device comprising a cup member of insulating material having a vertical axis and a concentric inner cylindrical surface and containing an electrolyte, four arcuate contacts mounted on the inner surface of said cup member, said contacts being concentrically arcuate and symmetrically disposed about said inner surface of said cup member, a cover member comprising an annulus of insulating material having a central opening, an upstanding metal tubular member extending through said central opening and having one end attached to said annulus and its other end closed by a liquid-tight cap member, a pendulum suspended from said cap member and extending into the electrolyte in said cup member, said pendulum forming one contact in a switch circuit extending through the electrolyte and through each of said arcuate contacts.

15. A pendulous potentiometer comprising a cup circular about an axis, a horizontal supporting plate having a central opening and serving to mount the cup with its axis vertical and co-axial with said opening, a tube rigidly supported on and extending upwardly from the plate co-axially with the cup and communicating with the chamber in the cup through said opening in the supporting plate, a closure disc sealing the upper end of the tube, a pendulum suspended from said closure disc and comprising a tubular element extending to the lower end of the tube and a circular bob element secured to the lower end of the tubular element and normally disposed concentrically in the cup chamber and free to oscillate therein, a fluid filling the cup and the tube and having viscosity to provide damping action to oscillations of the pendulum and having a limited electrical conductivity to serve as a conducting medium of high resistivity two pairs of diametrically and co-ordinately spaced arcuate contact terminals disposed flush on the inner surface of the cup, and an electrical terminal connection to the suspension of the pendulum to serve as a common terminal for the circuits to the terminals on the cup inner surface.

16. A pendulous potentiometer comprising a cylindrical vessel of insulating material symmetrical about a vertical axis and containing an electrically conducting electrolyte of high resistivity; stationary electrical terminal members supported on the wall of the insulating vessel to define a conducting path of high resistance in the electrolyte as a potentiometer; and a movable terminal element immersed in the electrolyte and serving as a take-off terminal of the potentiometer set up in the electrolyte between the two stationary terminals.

17. A pendulous potentiometer as in claim 16, in which two pairs of stationary terminal members are supported on the insulating vessel wall to establish two transverse co-ordinate paths through the electrolyte with the point of intersection of said paths substantially on the axis of the vessel.

18. A pendulous potentiometer as in claim 17, in which the movable contact member is pendulously supported from a point on the vertical axis of the cylindrical vessel.

19. A pendulous potentiometer comprising a cylindrical vessel symmetrical about a vertical axis and having a floor; a supporting post supported erect from the floor and having its top end free, and said post being disposed co-axially along said vertical axis; a liquid medium of high resistivity substantially filling the vessel to serve as an electrolyte; two pairs of stationary terminal plates with the plates of each pair disposed in diametrically opposed positions and with each pair disposed transversely of the other, to set up two relatively transverse paths that intersect at the vertical axis, said two conductive paths being of high resistance to serve as potentiometer resistors; and a movable terminal element pendulously supported from the top of said supporting post and immersed and freely movable in said electrolyte to serve as a take-off point of the potentiometers set up in the electrolyte between the respective pairs of stationary terminals.

References Cited in the file of this patent

UNITED STATES PATENTS

| | | |
|---|---|---|
| 1,589,039 | Kaempfe | June 15, 1926 |
| 1,932,329 | Urfer | Oct. 24, 1933 |
| 1,991,129 | Urfer | Feb. 12, 1935 |